United States Patent
Friedman

(10) Patent No.: US 6,381,901 B1
(45) Date of Patent: May 7, 2002

(54) COMBINATION DISPLAY ASSEMBLY AND LIVING PLANT PACKAGE AND METHOD OF PACKAGING SAME

(75) Inventor: Paul W. Friedman, Del Mar, CA (US)

(73) Assignee: HerbThyme Farms, Inc., San Francisco, CA (US)

( * ) Notice: Subject to any disclaimer, the term of this patent is extended or adjusted under 35 U.S.C. 154(b) by 0 days.

(21) Appl. No.: 09/436,075

(22) Filed: Nov. 8, 1999

(51) Int. Cl.[7] .................................................. A01G 25/00
(52) U.S. Cl. ........................................... 47/79; 206/752
(58) Field of Search ................................. 47/901, 101 R, 47/66.5, 66.6, 66.7, 72, 73, 84, 79, 41.01, 74, 87, 64, 77; 206/423, 752; 426/106

(56) References Cited

U.S. PATENT DOCUMENTS

| | | | | |
|---|---|---|---|---|
| 1,775,837 A | * | 9/1930 | Wedge | 47/74 |
| 2,932,384 A | * | 4/1960 | Johnnides | 206/423 |
| 3,142,133 A | * | 7/1964 | Brooks | 47/73 |
| 3,376,666 A | * | 4/1968 | Leonard | 47/41.01 |
| 3,513,594 A | * | 5/1970 | Hasselbach | 47/87 |
| 3,556,389 A | * | 1/1971 | Gregoire | 206/423 |
| 3,754,642 A | * | 8/1973 | Stidolph | 206/752 |
| 4,034,508 A | * | 7/1977 | Dedolph | 47/84 |
| 4,075,785 A | * | 2/1978 | Jones | 47/64 |
| 4,189,868 A | * | 2/1980 | Tymchuck | 206/423 |
| 4,241,537 A | * | 12/1980 | Wood | 47/77 |
| 4,586,288 A | * | 5/1986 | Walton | 47/73 |
| 4,999,946 A | * | 3/1991 | DeGiglio | 47/73 |
| 5,130,152 A | * | 7/1992 | Alameda | 426/106 |
| 5,315,785 A | * | 5/1994 | Avot | 47/72 |
| 6,061,955 A | * | 5/2000 | Domstein | 47/41.01 |
| 6,098,336 A | * | 8/2000 | Ferguson | 47/41.01 |

* cited by examiner

Primary Examiner—Charles T. Jordan
Assistant Examiner—Francis T. Palo
(74) Attorney, Agent, or Firm—Foley & Lardner; Bernard L. Kleinke

(57) ABSTRACT

A living plant is rooted in a growing medium, conically shaped plug which supports and helps nourish the roots of the living plant. A sleeve surrounds the plant and at least a portion of the plug to protect the plant and to retain the plug intact. The plug fits within an open bottom portion of the conical sleeve and receives nourishment during the display thereof. In another aspect of the invention, a display assembly includes a nourishing liquid containing pan having a plug receiving tray disposed therein. The tray is apertured to permit the liquid to be received therein for engaging the plug for nourishing the living plant while being displayed for sale.

9 Claims, 2 Drawing Sheets

COMBINATION DISPLAY ASSEMBLY AND LIVING PLANT PACKAGE AND METHOD OF PACKAGING SAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a combination display assembly and living plant package, and it more particularly relates to a method of packaging living plants for display and sale in retail grocery stores.

2. Background Art

In the past, plants have been packaged and sold by having individual living plants rooted in soil and then placed in storage containers receiving the individual soil mounds. In this manner, a large number of such growing plants could be transported by the purchaser to a location where the individual plants are then transplanted. In this regard, for example, growers have purchased large quantities of such individual seedlings for planting in the ground for production purposes, and later for commercial harvesting purposes.

While such packaging technique may be suitable for sale to growers for production purposes, such a technique for displaying and selling live vegetable plants rooted in soil is not at all suitable for sale in a grocery store where purchasers buy individual vegetable plants for consumption at home. In this regard, a live plant with a soil ball or clump does not lend itself to display and purchase in a grocery store, since the soil ball is not easily maintained and can become dislodged, especially when handled by a purchaser buying a number of purchases and using a shopping cart. Also, in transporting the product to ones home, the soil can also become dislodged and not remain intact. Also, the dislodged soil cannot readily be confined, and thus is, in general, messy. Typically, a shopper in a grocery store would only be interested in purchasing only a few numbers such as one or two of the individual plants, such as herbs, and when removing the soil bound plant from the multiple part plastic container or flat, the individual plant is not very stable. In this regard, even if one were to tear apart the plastic multiple part container so that one or two plants can be purchased, such a destruction of the container would be highly inconvenient and would probably necessitate the use of some tool, such as shears. Thus, living vegetable plants have not been marketed in retail grocery stores in such a manner.

For this reason, vegetable plants, such as herbs, have been marketed by selling packaged harvested herbs in the retail grocery stores. Such a marketing approach is highly desirable in the sense that groups of plants can be individually packaged so that a purchaser can select an individual quantity of the harvested vegetable for purchase, and can readily and conveniently place the harvested plant in his or her shopping cart. Thus, the harvested, package product can be neatly and conveniently transported to the purchaser's home for later consumption.

However, the harvested vegetable plants, such as herbs, typically have a very short shelf life. For example, harvested basil must be sold within a few days from the actual harvest. From the standpoint of the producer, there can be transportation problems in promptly shipping the product to the retail outlets. This transportation problem is exasperated when there are long distances involved, and rapid, expensive transportation must be employed.

Additionally, the store owner has the problem that the short shelf life can produce loss of inventory and/or stock shortfall. Such problems may translate to customer dissatisfaction. Additionally, the consumer or purchaser may find the product to be less than desirable, since the product may not be as fresh as one would desire.

Therefore, it would be highly desirable to have a new and improved packaging technique for facilitating the display for retail sale of vegetable plants which may be very fragile in nature. The new and improved packaging construction and method should greatly improve and extend the shelf life in the retail grocery stores. Furthermore, such a packaging technique should be relatively inexpensive, and attractively displayed.

SUMMARY OF THE INVENTION

Therefore, it is the principal object of the present invention to provide a new and improved combination display assembly and living plants which enable living plants to be marketed through retail stores with a greatly extended shelf life.

Another object of the present invention is to provide a new and improved display device for small living plants such as vegetable plants.

A further object of the present invention is to provide a new and improved living plant package.

Briefly, the above and further objects of the present invention are realized by providing a combination display assembly and living plant package, which is packaged in a unique manner to extend greatly the shelf life of the product when marketed at a retail outlet, such as a grocery store.

A living plant is rooted in a growing-medium, conically shaped plug which supports and helps nourish the roots of the living plant. A sleeve surrounds the plant and at least a portion of the plug to protect the plant and to retain the plug [in tact] intact. The plug fits within an open bottom portion of the conical sleeve and receives nourishment during the display thereof. In another aspect of the invention, a display assembly includes a nourishing liquid containing pan having a plug receiving tray disposed therein. The tray is apertured to permit the liquid to be received therein for engaging the plug for nourishing the living plant while being displayed for sale.

Thus, the novel packaging and display arrangements of the present invention enable a purchaser to select individual packaged living vegetable plants, such as herbs, at a retail grocery store and conveniently transport individual ones of them to the purchaser's home. Thereafter, the packaged plant can be unpackaged and the plug placed in a suitable container such as a drinking glass partially filled with water. In such an environment, the plant can continue to grow and the purchaser can harvest the herb for consumption as needed. The plant will then continue to produce foliage for consumption for long periods of time, without requiring refrigeration. Also, the plant is decorative in appearance and may be fragrant.

Therefore, the producer and the retail sales outlet are able to extend greatly the shelf life, and the transportation and shipping of the product are greatly facilitated since the product is far less fragile in nature as compared to a harvested plant.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
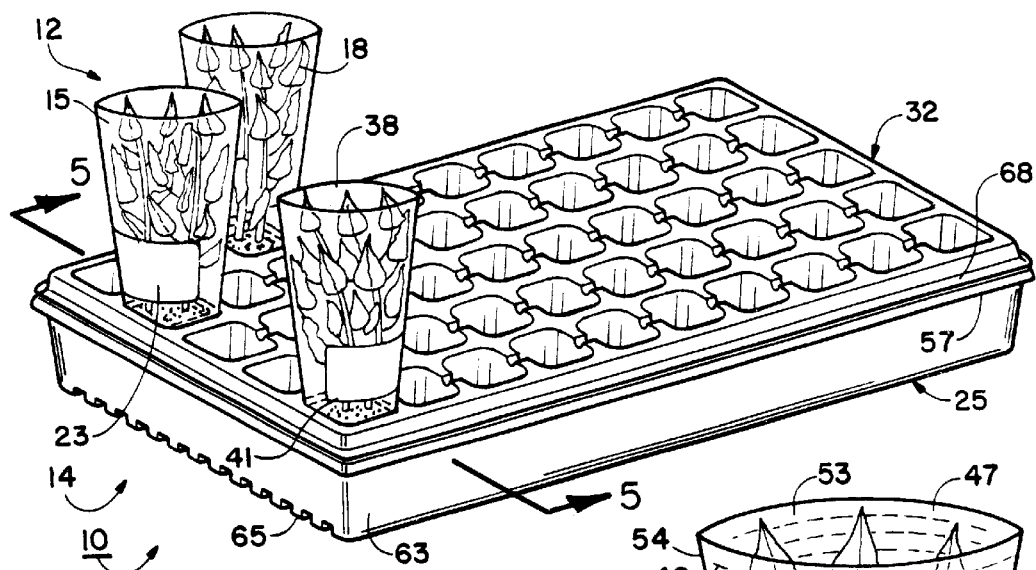
FIG. 1 is a pictorial view of a combination display assembly and living plant package, which is constructed in accordance with the present invention.

Referring now to the drawings, and more particularly to FIG. 1 thereof, there is shown a combination display assembly and living plant package generally indicated at 10, which is constructed in accordance with the present invention. The combination 10 is adapted to be conveniently displayed in the grocery section of a store (not shown) so that purchasers can purchase the small vegetable plants with greatly extended shelf life, since the vegetable plants are living plants.

Figure 3:
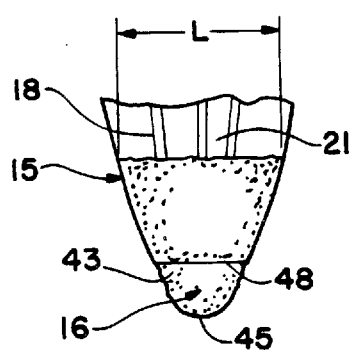
FIG. 3 is a fragmentary enlarged front elevational view of the bottom portion of the packaged plant of FIG. 2.
Figure 4:
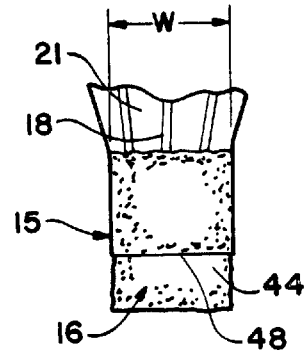
FIG. 4 is a fragmentary enlarged side elevational view of the bottom portion of the packaged living plant of FIG. 2.

The combination 10 generally comprises a group of small individual living plant packages generally indicated at 12, which are supported from below in an upright manner by a rectangularly shaped display assembly 14 for nourishing the individual small plant packages 12, such as the plant package 15. Each one of the like living plant packages 12, such as the plant package 15, includes a growing medium plug 16 which is configured in a generally conical shape having a rectangular cross section throughout its axial length. As shown in FIGS. 3 and 4, the upper surface of the plug has a length L at the front portion thereof and a width W at the side portion thereof. A living plant 18 is rooted in the plug 16 and can be a vegetable plant, such as an herb. However, it will become apparent to those skilled in the art that the plant package of the present invention may be used for marketing various different types of plant material including, but not limited to, decorative blooming house plants and others.

A conical shaped transparent plastic sleeve 21 surrounds the plant and the upper portion of the plug for retaining the plug 16 in an [in tact] intact condition to help avoid the plug from becoming dislodged from its plant, and for protecting the plant during transportation and display for sale to the public. A product description label 23 is affixed to the outer front surface of the sleeve and bears product description and advertising indicia 24 (FIG. 5) thereon.

A conical shaped transparent plastic sleeve 21 surrounds the plant and the upper portion of the plug for retaining the plug 16 in an in tact condition to help avoid the plug from becoming dislodged from its plant, and for protecting the plant during transportation and display for sale to the public. A product description label 23 is affixed to the outer front surface of the sleeve and bears product description and advertising indicia 24 (FIG. 5) thereon.

The display assembly 14 includes an open top pan 25 containing plant nourishing liquid such as water 62 (FIG. 5), and a tray 32 having perforated plug receiving wells generally indicated at 34 for receiving and supporting the living plant package 15. Each one of the wells, such as a perforated well 36 (FIGS. 5 and 6) extend into the hollow interior of the pan 25 for receiving the water 62 therein to nourish the plug 16 received therein. The well 36 has a generally square cross sectional shape along its axial length as shown in FIG. 6, the square shape has a side of length S, which is slightly larger than the length L of its plug 16 for enabling the plug to be inserted into its well in two different orientations or directions for the label 23 on the sleeve 21 to face so that the label can be positioned forwardly or sidewardly relative to the display [, play] assembly 14, for display purposes depending upon the orientation of the display assembly 14 at the grocery store location. In this regard, due to the construction of the plug 16 relative to the square shape of the well 36, the package 15 can be oriented in the well 36 with either the label facing the long dimension of the assembly 14, or facing the short dimension of the assembly 14.

The display assembly 14 includes an open top pan 25 containing plant nourishing liquid such as water 62 (FIG. 5), and a tray 32 having perforated plug receiving wells generally indicated at 34 for receiving and supporting the living plant package 15. Each one of the wells, such as a perforated well 36 (FIGS. 5 and 6) extend into the hollow interior of the pan 25 for receiving the water 62 therein to nourish the plug 16 received therein. The well 36 has a generally square cross sectional shape along its axial length as shown in FIG. 6, the square shape has a side of length S, which is slightly larger than the length L of its plug 16 for enabling the plug to be inserted into its well in two different orientations or directions for the label 23 on the sleeve 21 to face so that label can be positioned forwardly or sidewardly relative to the display, play assembly 14, for display purposes depending upon the orientation of the display assembly 14 at the grocery store location. In this regard, due to the construction of the plug 16 relative to the square shape of the well 36, the package 15 can be oriented in the well 36 with either the label facing the long dimension of the assembly 14, or facing the short dimension of the assembly 14.

In use, the group 12 of individually packaged living plants are positioned in the wells 34 of the display assembly 14 in a desired orientation. The plug 16 is positioned and supported within the well 36 and the upper portion of the plant package 15 and its label 24 is disposed above the well. In this manner, the nourishing fluid such as water 62 is admitted to the wells for nourishing the plants from below, while they are on display for sale. Since the plants are living and nourished, the shelf life is greatly extended as compared to harvested plants. Moreover, once the purchaser buys one or more of the individual plant packages, the plants such as the plant 18 continues to grow and can be harvested repeatedly, thus providing a cost savings to the purchaser as compared to cut vegetable plants for retail sale.

Relative to the orientation of the display assembly 14, it is, of course, highly desirable to have all of the labels on the living plant packages 12 to be facing in the same direction for ease of reading by prospective purchasers. As indicated in FIG. 1, the living plant package 15 has its label 23 displayed toward the shorter end of the assembly 14 and another living plant package 38 has its label 41 facing in the direction of the longer side of the assembly 14. Thus, in accordance with the present invention, all of the individually packaged living plants 12 should be oriented conveniently either in a direction with all of their labels facing toward the end of the assembly 14 or facing toward the longer side of the assembly 14. It should be understood that the relative positions of the plant packages 18 and 38 of FIG. 1 are positioned for illustration purposes only, and they would be positioned with their labels facing the same direction in actual use.

Figure 2:
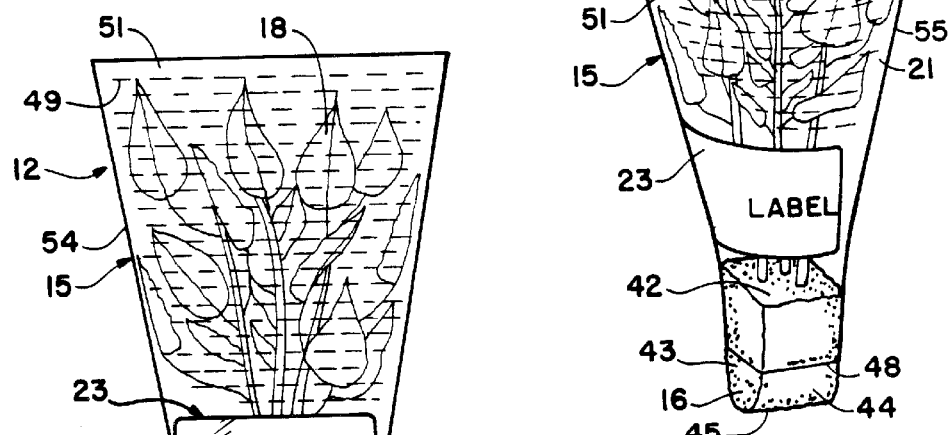
FIG. 2 is an enlarged pictorial view of one of the living plant packages of FIG. 1, illustrating it removed from its display assembly.

Considering now the plant package 15 in greater detail, the plug 16 of the package 15 is composed of a suitable organic or inorganic growing medium. The preferred growing medium is an inorganic growing medium marketed under the trade name "OASIS." The plug 16 has a rectangular top surface 42 (FIG. 2), and a pair of tapered sides such as a front side 43 (FIGS. 2 and 3). The plug 16 also includes a pair of generally rectangular narrow end walls such as an end wall 44, and a slightly rounded bottom end or tip portion 45. Due to the tapered shape of the plug 16, the plant 18 can be removed conveniently from its sleeve 21 without damaging the plant, even though the bottom portion of the sleeve is tightly attached to the plug 16 to retain it in place during display and sale of the product.

The sleeve 21 is generally conical in shape and has a large top opened 47 (FIG. 2) and narrows to an open bottom end 48 to permit the plug bottom end 45 to protrude therefrom. The bottom portion of the conical sleeve 21 fits snugly about the tapered plug 16. The sleeve 21 is composed of a suitable plastic film material to conform tightly and to grip to the outer surface of the plug 16.

The sleeve 21 has rows of perforations, such as a perforation 49, for permitting air circulation to the plant 18. The sleeve preferably comprises a pair of respective front and back generally triangularly shaped panels 51 and 53 heat sealed together along a pair of seams 54 and 55. The label 24 is affixed to the front panel 51.

Figure 5:
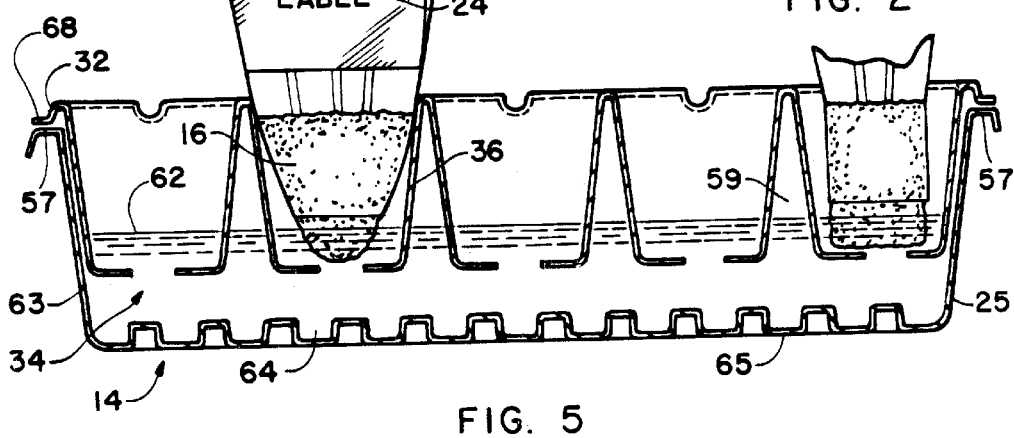
FIG. 5 is an enlarged sectional view of the combination display assembly and living plant package of FIG. 1 taken substantially on line 5—5 thereof.
Figure 6:
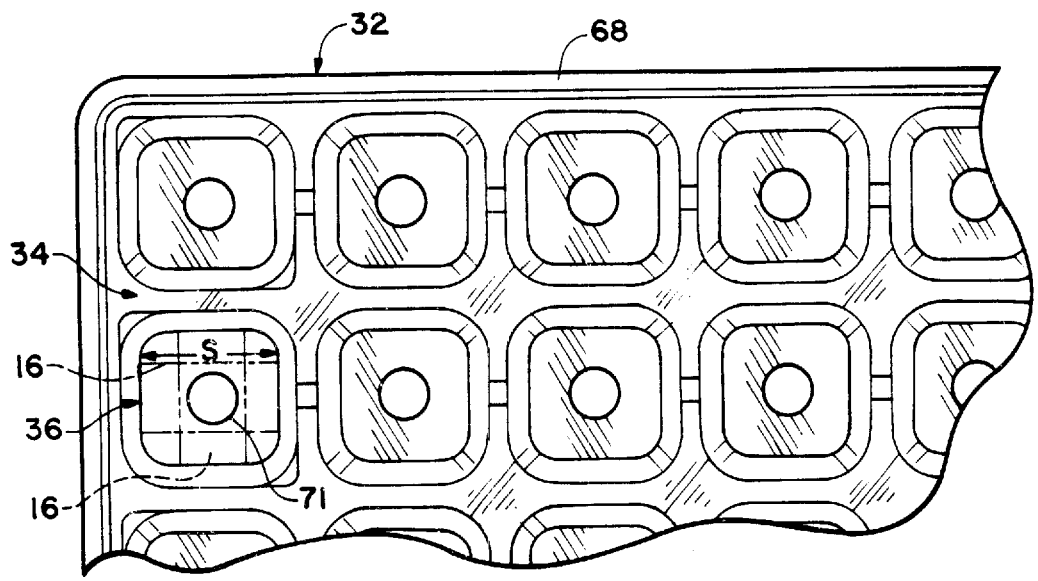
FIG. 6 is a greatly enlarged fragmentary plan view of the tray of the assembly of FIG. 1.
Figure 7:
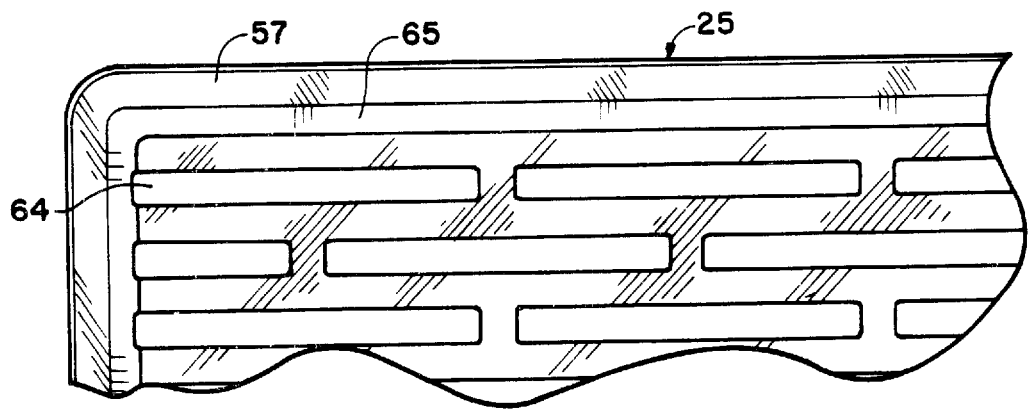
FIG. 7 is a fragmentary, greatly enlarged plan view of the pan of the assembly of FIG. 1.

Considering now the open top pan 25 in greater detail with reference to FIGS. 1, 5 and 7 of the drawings, the pan [23] 25 includes an upper rim 57 for supporting the tray 32. The pan 25 is generally rectangular in shape and has a hollow interior 59 which confines the water 62 for nourishing the living plants [12] 18. The pan 25 includes a rectangular shaped side wall 63 and a Considering now the open top pan 25 in greater detail with reference to FIGS. 1, 5 and 7 of the drawings, the pan 23 includes an upper rim 57 for supporting the tray 32. The pan 25 is generally rectangular in shape and has a hollow interior 59 which confines the water 62 for nourishing the living plants 12. The pan 25 includes a rectangular shaped side wall 63 and a bottom wall 65. A series of longitudinal extending segmented corrugations 64 are integrally formed in the bottom wall to strengthen it and to permit the water to communicate throughout the entire area. The pan 25 is composed of suitable lightweight plastic material.

The tray 32 is complimentary in shape relative to the pan 25 and includes a rectangular flange 68 for resting on the rim 57 of the pan 25. The wells 34 depend from the flange 68 and extend into the hollow interior 59 (FIG. 5) of the pan 25. Each one of the bottom walls of the wells is apertured, and for example, the well 36 includes a circular hole 71 to admit water 62 from the pan 25 into the interior of the well 36 containing the plug 16 for nourishing the plant 18.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A combination display assembly and living plant package, comprising:

a group of individual living plant packages, each one of said plant packages including a growing medium plug configured in a generally conical shape having a rectangular cross section throughout its axial length, said plug having an upper surface having a length L at the front side portion thereof and a width W at the end portion thereof, and a living plant rooted in said plug and growing upwardly therefrom, and a conical shaped sleeve surrounding said plant and an upper portion of said plug for retaining the plug intact and for protecting the plant during transportation and display for sale to the public, said plug having an exposed portion not surrounded by said sleeve, said sleeve having product indicia means generally disposed at the front portion thereof; and a generally rectangular display assembly including an open-top pan having a rim and a hollow interior, said pan for storing a quantity of plant nourishing liquid, and a tray supported on said rim for holding said plant packages, said tray having a group of plug receiving perforated wells extending into said hollow interior of said pan for receiving the liquid therein to supply the liquid to the exposed portion of said plug received therein for nourishing its plant, each one of said wells having a generally square cross sectional shape along its axial length, the side of length S of the square being slightly larger than the length L of its plug for enabling the plug to be inserted into its well in two different orientations for displaying said product indicia means of its plant package either facing toward a long dimension of the assembly or toward a short dimension of the assembly for display purposes, each one of said wells having a well bottom.

2. A combination according to claim 1, wherein said sleeve is composed of transparent plastic material and is perforated for exposing the living plant to light and to air.

3. A combination according to claim 1, wherein said plug is composed of organic growing medium.

4. A combination according to claim 1, wherein said plug is composed of inorganic growmg medium.

5. A combination according to claim 4, wherein said inorganic growing medium is "OASIS" in organic growing medium.

6. A combination according to claim 1, wherein said sleeve is generally conical in shape and has an open bottom end portion for exposing a portion of its plug therefrom.

7. A combination display assembly and living plant package, comprising:

one or more individual living plant packages, each of said packages comprising:
a growing medium plug having an upper portion and a lower portion;
a living plant rooted in said plug and growing upwardly therefrom; and
means for confining said living plant and said upper portion of said plug, said means for confining having an open bottom portion; and a display assembly, comprising:
- an open-top pan having a rim, a bottom and a hollow interior, said pan being adapted to store a plant-nourishing material;
- a tray supported on said rim, said tray having one or more wells extending into said hollow interior of said pan,
- each well being configured to accommodate at least said lower portion of said plug, and
- each well having a well bottom and having perforations, said perforations being sufficiently large in size to allow communication with said plant-nourishing material and sufficiently small to allow said well to retain said plant package above said bottom of said pan.

8. The combination display assembly and living plant package according to claim 7, wherein said well extends into said hollow interior to a depth greater than one-half of a depth of said hollow interior.

9. The combination display assembly and living plant package according to claim 7, wherein each said plug has a rectangular cross-section throughout an axial direction and wherein each said well is configured to accommodate said rectangular cross-section.

* * * * *